United States Patent [19]

Behnke et al.

[11] 4,334,810
[45] Jun. 15, 1982

[54] GEAR DEBURRING APPARATUS AND METHOD

[75] Inventors: Horst Behnke, Zorneding; Herbert Loos, Dorfen; Udo Luhmer, Munich; Manfred Heckmaier; Rudolf Kerschl, both of Unterpfaffenhofen, all of Fed. Rep. of Germany

[73] Assignee: Carl Hurth Maschinen- und Zahnradfabrik GmbH & Co., Munich, Fed. Rep. of Germany

[21] Appl. No.: 118,819

[22] Filed: Feb. 5, 1980

[30] Foreign Application Priority Data

Feb. 8, 1979 [DE] Fed. Rep. of Germany ....... 2904717
Dec. 18, 1979 [DE] Fed. Rep. of Germany ....... 2950879

[51] Int. Cl.³ .............................................. B23F 19/00
[52] U.S. Cl. ........................................ 409/9; 51/287; 409/8
[58] Field of Search ................... 409/8, 9; 51/287, 67; 407/27

[56] References Cited

U.S. PATENT DOCUMENTS

| 2,278,300 | 3/1942 | Barter et al. | 409/8 |
| 2,443,227 | 6/1948 | Cook et al. | 51/67 X |
| 3,618,264 | 11/1971 | Hou | 51/287 X |
| 3,729,967 | 5/1973 | Bauknecht et al. | 409/9 X |
| 4,024,672 | 5/1977 | Wieck | 51/67 X |
| 4,068,558 | 1/1978 | Loos | 409/8 |

FOREIGN PATENT DOCUMENTS

| 2542372 | 9/1976 | Fed. Rep. of Germany | 409/8 |
| 2739399 | 3/1979 | Fed. Rep. of Germany | 409/8 |
| 251403 | 1/1970 | U.S.S.R. | 51/67 |

Primary Examiner—William R. Briggs
Attorney, Agent, or Firm—Blanchard, Flynn, Thiel, Boutell & Tanis

[57] ABSTRACT

In an apparatus for the cutting, deburring or breaking of the side tooth edges of gears with one or two tools which are located on the side of a guide gear and which machine the aforesaid tooth edges. The guide gear meshes with the workpiece, and, in one embodiment, is constructed as a measuring gear. Prior to the actual machining operation, the distance between the axes of the pretoothed workpiece and the measuring gear is measured independently and is made visible, if desired, on an indicating device. In order to avoid incorrect measurement results due to burrs existing on the workpiece, the guide gear can, if desired, have recesses into which extend the burrs.

10 Claims, 8 Drawing Figures

GEAR DEBURRING APPARATUS AND METHOD

FIELD OF THE INVENTION

The invention relates to an apparatus for the cutting, deburring or breaking of the side tooth edges of gears and a method for this apparatus.

BACKGROUND OF THE INVENTION

Prior to the precision working of tooth flanks of pretoothed spur gears by shaving, rolling or similar methods, there generally occurs a control over the workpiece so as to maintain the prescribed dimensions, in particular the tooth-width dimension. Otherwise, if deviations in the measurements exist, it is possible for the precision machining tool to be destroyed. On assembly lines, where the machines are connected to suitable conveying devices which move the workpieces independently into the operating chamber of the machine and remove same again after the respective machining operation, this control requires a relatively high input of supply, chucking and drive devices for the measuring station.

Therefore, the basic purpose of the invention is to combine the measuring device with an operation which occurs prior to the finish working of the tooth flank. This purpose is inventively attained by changing or supplementing a conventional apparatus for the cutting, deburring or breaking of the side tooth edges so that it can also be used as a measuring device. Such an apparatus is described in German AS No. 23 19 060 and U.S. Pat. No. 4,068,558, in which gearlike tools are provided on axially facing sides of the workpiece, the teeth of which are provided with cutting edges and which are fixedly connected against rotation with a guide gear which is arranged between them and which meshingly engages the workpiece. When the guide gear is designed wider than the tooth system of the workpiece, then it can be constructed as a measuring gear. For breaking or deburring the side tooth edges of the workpiece, the apparatus, after meshing interengagement is established, is moved in axial direction first to the one and then to the other side until the cutting edges have produced the desired edge break or chamfer on the workpiece teeth. With this the advantage is simultaneously achieved that the center adjustment of the apparatus must not occur so exactly as in the known apparatus, where both front sides of a workpiece are machined simultaneously. A further advantage is to be seen in that for similar workpieces with different tooth width the same tool can be used. This of course is also true for apparatus of the described type, in which the guide gear is not constructed as a measuring gear, for which reason the invention is also directed to this.

A guide gear which is constructed as a measuring gear can be moved into engagement prior to the actual operation of deburring or edge breaking until a backlash does no longer exist. The thereby existing distance between the axes is measured independently at a low speed and is compared with a pregiven desired value.

If the desired value is exceeded or does not reach a certain value, the machine is switched off and the measurement result is indicated. The respective workpiece can then either be reworked or it becomes scrap. If the given desired value is maintained, then the guide gear and the workpiece are moved away from one another until a small amount of backlash exists. The deburring or edge breaking occurs then at a higher speed, by moving the apparatus as already described in the axial direction.

Through the burr which exists on the pretoothed workpieces, it can easily happen that the measurement result is erroneous, namely, when the flanks of the workpiece do not directly rest on the flanks of the measuring gear, but rest on the burrs which exist on the side edges. The flanks of the guide or measuring gear are, therefore, advantageously provided with recesses which extend from the tooth addendum to the tooth dedendum at each of two locations which are spaced from one another approximately at the distance of the tooth width of the workpiece to be machined. These recesses can be formed by grooves which extend in direction of the tooth height or by slots which divide the teeth into three side-by-side lying sections. The burrs which exist on the workpiece extend then into the recesses in the flanks, where they do not contact the flanks themselves. It is thusly assured that the workpiece flanks correctly rest on the flanks of the measuring gear and a satisfactory measurement result is achieved.

BRIEF DESCRIPTION OF THE DRAWINGS

The invention will be described hereinbelow in connection with one exemplary embodiment which is illustrated in eight figures.

In the drawings.

DETAILED DESCRIPTION

Figure 1:
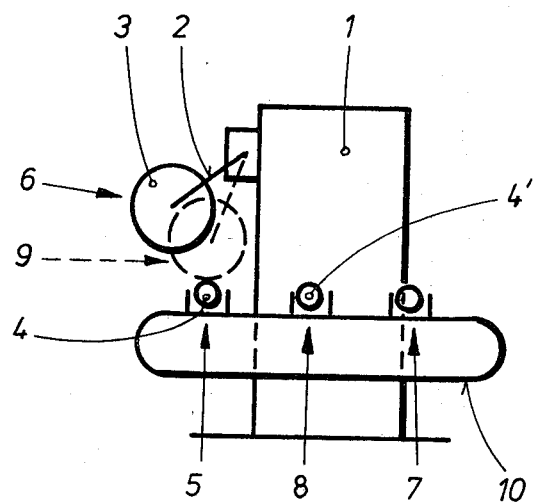
FIG. 1 is a schematized illustration of a machine, on which the apparatus and the method can be applied.

FIG. 1 schematically illustrates a frame of a machine 1, on which an apparatus 3 is pivotally supported on a carrier 2 so that it can engage a workpiece 4, namely, a gear, which is in an operating position 5 to facilitate a machining operation when in the broken line position thereof. However, the apparatus is in FIG. 1 shown in a solid line position which is a rest or nonworking position 6. The workpiece can be moved into the operating position by means of a transporting or conveyor mechanism 10. The transporting mechanism is designed so that between the operating position 5 and a loading position 7 there are provided one or more workpieces 4' in a waiting position 8.

If a workpiece 4 which is to be machined is in the operating position 5, then the apparatus 3 is swung into an operating position 9 (broken lines in FIG. 1), in which it becomes meshed with the workpiece. The apparatus 3 is driven rotatingly by a motor M1 through a conventional and, therefore, schematically illustrated drive mechanism 33A to a tool spindle 34. Through this structure, the workpiece 4 which mates with the apparatus 3 is rotatably driven.

The apparatus 3 consists substantially of a noncutting, toothed guide gear 11 (FIGS. 2 and 3) which is wider than the teeth of the workpiece 4 which is to be machined. A pair of cutting gears 12 and 13 is fastened as actual tools to and on the opposite two sides of the guide gear 11 with suitable, conventional and, therefore, not illustrated means. The cutting gears have teeth 14 on the periphery thereof, which teeth are formed similarly to the ones on bevel gears, namely, so that they penetrate from the sides of the workpiece 4 into the tooth spaces 15, when the apparatus 3 is moved in an axial direction relative to the workpiece 4 (FIG. 4), as will be explained in more detail below. During this penetration into the tooth spaces 15, the flanks 16,17 of the cutting gear teeth 14 machine the edges 18,19 on the flanks and in the root of the tooth space at the axial ends of the workpiece teeth 20. Various constructions are known for the cutting edges on the cutting gears 12,13 so that they do not need to be discussed here (See, for example, U.S. Pat. Nos. 4,068,558 and 4,155,677).

Figure 5:
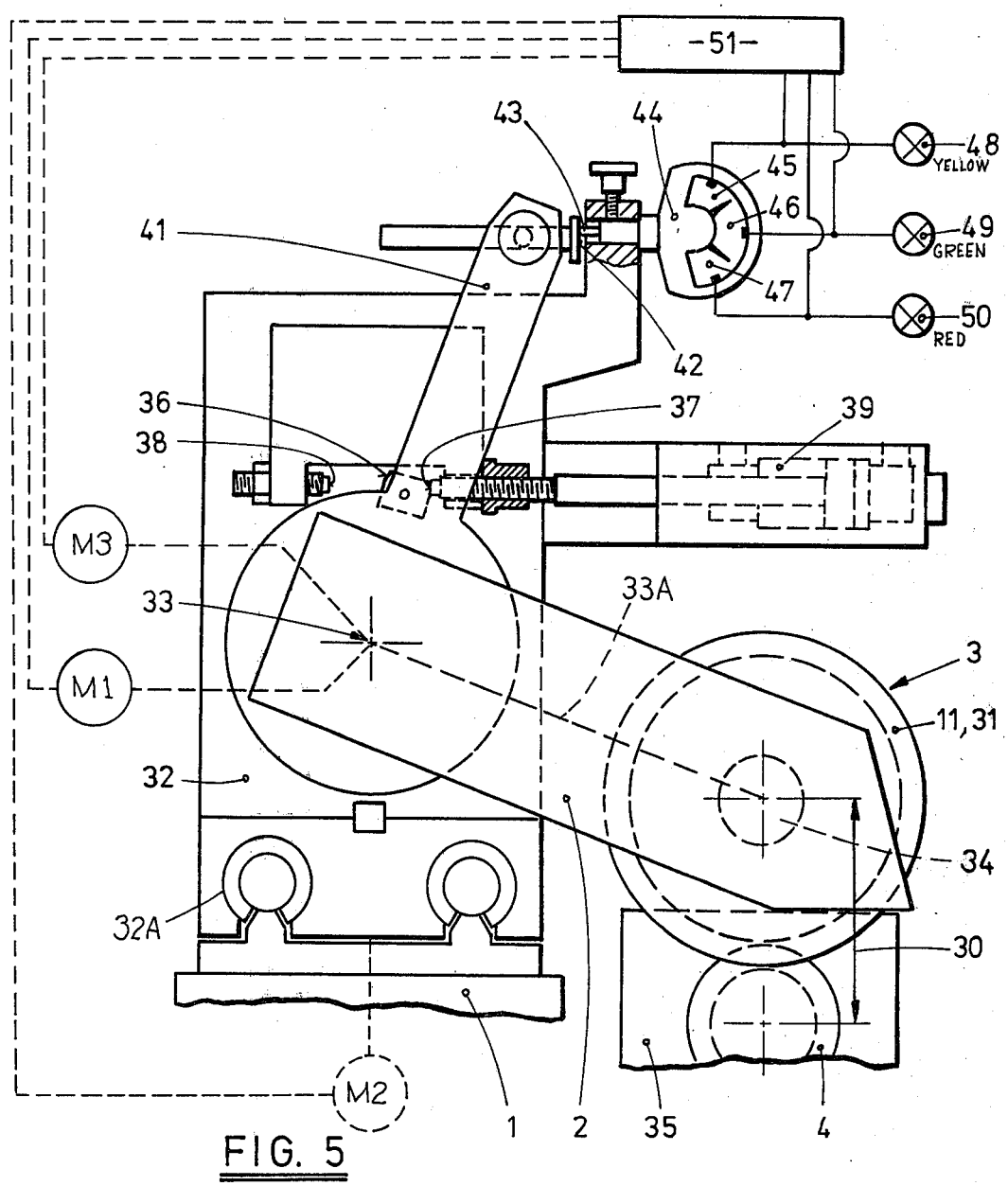
FIG. 5 is a simplified side view of the apparatus and its installation in the machine.

FIG. 5 illustrates an arrangement of the tool in the machine. A tool carriage 32 is supported for longitudinal movement on conventional and, therefore, not described in detail guide means 32A on the frame of the machine 1. With reference to FIG. 5, this longitudinal movement takes place perpendicularly with respect to the plane of the drawing. The drive for the carriage 32 is schematically illustrated at M2. The tool carrier 2 is pivotally mounted on the tool carriage 32 about the axle 33. The tool carrier 2 is pivotally driven about the axis of the axle 33 by a drive mechanism M3. The tool 3 is rotatably supported drivably and exchangeably at the end of the tool carrier remote from the pivot axle 33. The rotary drive for the tool 3 is derived from the shaft of the motor M1 which drives the pivot axle 33 and suitable transmitting elements 33A within the tool carrier 2 acting onto the tool spindle 34. In the illustrated position of the tool carrier 2, the guide gear 11 engages the workpiece 4. The workpiece is rotatably mounted in suitable collets, for example between tailstocks 35, which are adjustably fastened to the machine frame 1.

Figure 2:
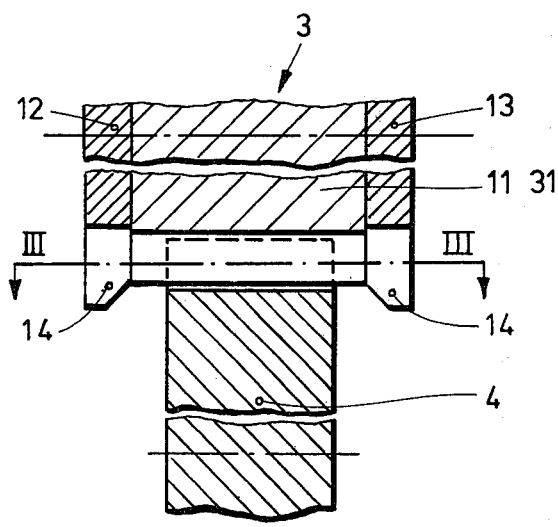
FIG. 2 illustrates a portion of an apparatus according to the invention, namely a cross section of the tooth system which is in meshing engagement.
Figures 3, 4:
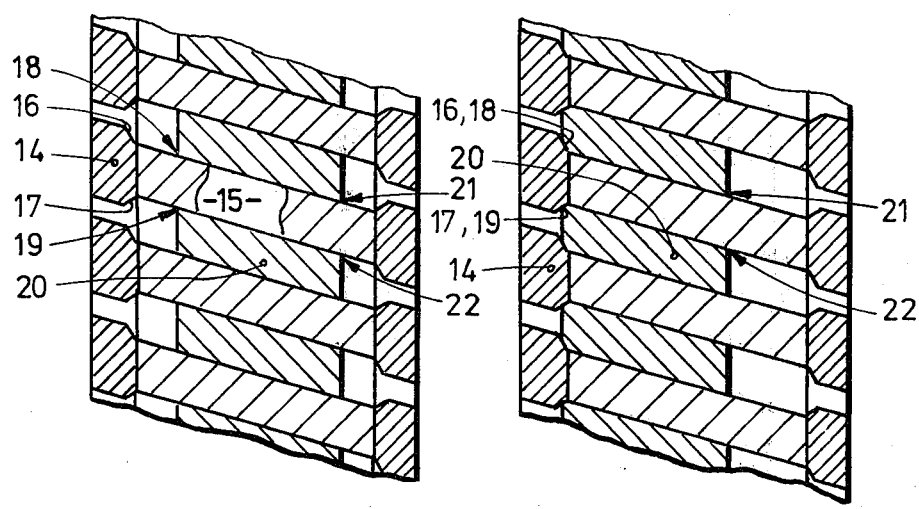
FIG. 3 illustrates a cross section of a portion of the apparatus in connection with a workpiece along the line III—III of FIG. 2.
FIG. 4 illustrates the same parts, however, axially shifted in such a manner that the tool teeth break the edges on one side of the workpiece teeth.
Figure 6:
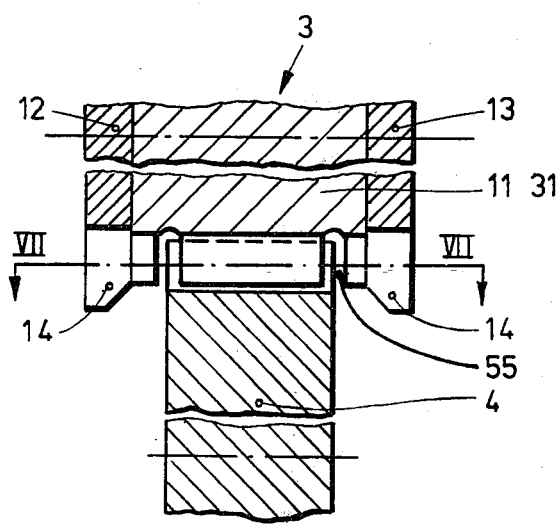
FIG. 6 illustrates a portion of a different construction of the apparatus, namely, a cross sectional view of a tooth system which is in meshing engagement.
Figure 7:
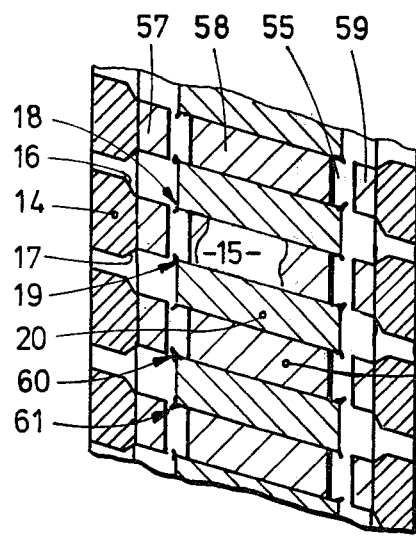
FIG. 7 illustrates a portion of the apparatus in connection with a workpiece and in cross section taken along the line VII—VII of FIG. 6.
Figure 8:
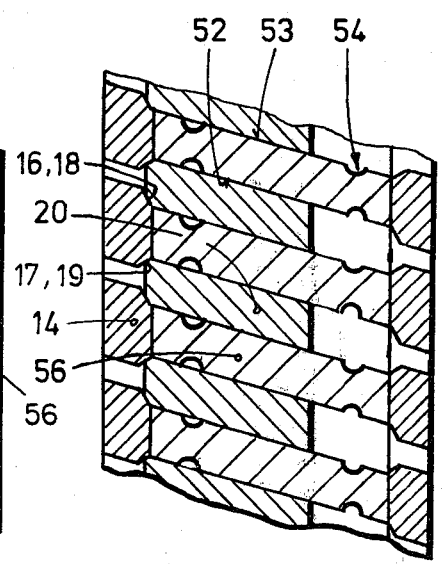
FIG. 8 illustrates the same parts, however, axially shifted in such a manner that the tool teeth break the edges on one side of the workpiece teeth.

FIGS. 6,7 and 8 illustrate analogously to FIGS. 2,3 and 4 a different embodiment of the apparatus.

The tooth flanks 52,53 of the guide gear 11 are provided with interruptions in their surface. These interruptions may be grooves 54 with any desired cross section and which extend in direction of the tooth height, as is illustrated in FIG. 3. However, they may also be slots 55, which divide the teeth 56 of the guide gear 11 into three sections 57,58,59 each. The width of the center section 58 and the spacing between the grooves 54 is slightly smaller than the width of the workpiece teeth 20. With this and with the recesses 54,55 which extend beyond the workpiece teeth, it is achieved that the burrs 60,61 which exist on the side edges, for example at 18,19 of the teeth 20 do not engage the tooth flanks 52,53 but are free thereof and do not influence the measurement result.

OPERATION

The sequence of operation during deburring or breaking of the side or axially facing tooth edges of spur gears is as follows. First the tool 3 and the workpiece 4 are radially spaced from one another and approximately centrally radially aligned to one another (compare FIG. 1, positions 5 and 6). During a rotating of the tool, same first approaches the workpiece until the teeth of the guide gear 11 meshes with the teeth of the workpiece 4 and finally only a small amount of backlash exists. In this position of the tool carrier 2, a dog 36 which is fastened to said tool carrier rests against a stop, for example at 37. The workpiece 4 is now rotatably driven by the tool 3 about the axles on the tailstocks 35. The tool carriage 32 and thus the tool 3 is now moved longitudinally along the guide means 32A by the drive M2 which can be, for example, a hydraulic cylinder or a threaded spindle, until the teeth 14 of the cutting gear 12 penetrate the tooth spaces 15 of the workpiece 4 and the cutting edges deburr or break the side tooth edges 18,19. The tool or the tool carriage is subsequently moved axially in the opposite direction by the drive M2, until the side tooth edges 21,22 on the opposite side of the workpiece are deburred or broken by the teeth 14 of the cutting gear 13. The tool 3 is subsequently moved into the centered position relative to the workpiece and out of engagement. To limit the angle of swing, a further adjustable stop 38 is provided for the rest position, on which stop will rest the cam 36. This stop may also be designed identical to the oppositely positioned stop 37. Both stops 37 and 38 are mounted, corresponding with the tool dimensions, adjustably on the tool carriage 32. In order to prevent a pivoting of the tool carrier 2 away from the workpiece during the machining operation, a force which is directed against the lifting off direction is applied to the cam 36 to hold the cam 36 against the stop 37. This force can be, if desired, provided by the drive mechanism M3.

The devices which are needed for measuring the workpiece with the tool 3 are also illustrated in FIG. 5. In this embodiment, the guide gear 11 is designed as a measuring gear 31. Measuring gears, also known as master gears, as such are known and do not need to be further described here. An example of a measuring gear is set forth in Darle W. Dudley's "Gear Handbook" of 1962. An arm 41 which is swingable with the tool carrier 2 is mounted on the tool carrier, which arm has at its free end an adjustable guaging surface 42. The guaging surface 42 acts onto a ram or plunger 43 of a dial gauge 44, which is mounted on the tool carriage 32. The adjustable stop 37 is, in this instance, designed as a so-called hydraulic fixed stop. A pushing back movement, the purpose of which will be explained below, is effected by a hydraulic cylinder 39 mounted on the tool carriage 32.

The dial gauge 44 has a measuring range, which is divided into three variable subranges 45,46,47. Depending on in which subrange lies the respective measured value, different electrical signals are generated. Such dial gauges are available in the market and known as "electrical precision indicators". One such indicator is disclosed in the 1974 catalog "Feinmessgeräte" of the German firm Carl Mahr. In the present case, the three subranges 45,46 and 47 are each connected to an alarm lamp 48,49 and 50, respectively, which is arranged for example on the operating panel of the machine. The subranges are furthermore connected with the control device 51 for the machine to control, through electrical circuitry which is obvious to persons of ordinary skill in this art area and, therefore, not illustrated, the operation of the machine.

The measuring operation occurs before the actual machining operation in order to sort out workpieces which have a tooth width dimension which is either too large or too small and to particularly avoid, in the first case, damage to the tools of subsequent precision machining operations like shaving, rolling, etc. The tool 3 and the workpiece 4 are initially radially spaced from one another and approximately centrally radially aligned. The hydraulic fixed stop 37 is pulled back or retracted. By slightly rotating the tool at approximately 50 min$^{-1}$, same is swung toward the workpiece by the drive mechanism M3 until the measuring gear 31 meshes with the workpiece 4 and at a small pressure until backlash no longer exists. The distance 30 between the axle of the tailstock and the axle 34 is transmitted through the tool carrier 2, the arm 41 and the gauging surface 42 onto the dial gauge 44. The result is forwarded by one of the three alarm lamps and the control 51. If the measurement result lies in the range 45, then the workpiece has too much admeasurement, the lamp 48 lights up, for example yellow. If the measured distance between the axes lies within the pregiven tolerance in the range 46, then the lamp 49 lights up, for example green. However, if the measurement result lies in the range 47, then the workpiece has too little admeasurement, namely, it is scrap and the lamp 50 lights up red, for example. In the cases where the measurement result lies in the measuring ranges 45 and 47, the tool is swung away from the workpiece and the machine is stopped. The workpiece can then be manually removed from the machine, for example. However, if the workpiece is within acceptable tolerances, the tool is driven at an increased speed. At the same time, the hydraulic fixed stop 37 is moved forwardly or extended, so that between the measuring gear 31 which serves as a guide gear and the workpiece 4 there is created a little backlash. Then the apparatus 3 is pressed against the fixed stop 37 by the drive mechanism M3 to develop an increased holding pressure. The deburring or edge breaking occurs as above described during a reciprocal longitudinal movement of the tool carriage 32.

The invention is not limited to the described devices. Thus it is, for example, possible that the workpiece is rotatingly drivably mounted and the tool is rotatably driven by the workpiece. Also it is not a condition for the described methods and tools, that the workpiece is deburred on both axially facing sides, a one-sided deburring with an apparatus having only one cutting gear 12 or 13, is accordingly also possible.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for deburring or chamfering the axial edges of teeth on a workpiece, said device comprising a tool having a toothed, noncutting guide gear and at least one toothed cutting tool fixedly mounted on an axially facing side of said guide gear, the teeth on said guide gear being axially aligned with the teeth on said cutting tool, each tooth on said cutting tool having on the edges thereof adjacent said guide gear a beveled surface facing axially toward said guide gear, said beveled surface having cutting means thereon, the improvement comprising wherein the width of said guide gear is larger than the width of said workpiece which must be deburred, and means are provided for moving said guide gear and said cutting tool thereon axially to cause said cutting means on said cutting tool to engage said workpiece whereby a meshing engagement of said cutting tool with said workpiece will effect an engagement of said beveled surface and said cutting means thereon and a cutting of a beveled edge on the corresponding axially facing edge of the teeth on said workpiece.

2. The device according to claim 1, wherein said guide gear is a measuring gear and wherein said device further includes means for effectively measuring the tolerances of a workpiece before a deburring thereof.

3. The device according to claim 2, wherein the tooth flanks of said guide gear have recesses which extend from the tooth addendum to the tooth dedendum at each of two points which are spaced from one another approximately the distance of the tooth width of the workpiece to be machined.

4. The device according to claim 3, wherein said recesses in said tooth flanks are formed by grooves which extend in direction of the tooth height.

5. The device according to claim 3, wherein the recesses of said tooth flanks are formed by slots which divide the teeth into three side-by-side lying sections.

6. A method for the cutting, deburring or breaking of the side tooth edges of straight and helically toothed gears comprising the method steps of:
   (a) moving a guide gear and workpiece, initially positioned in radial spaced relation and generally centrally radially aligned to one another, and during a rotating drive of at least one of said guide gear and said workpiece, into a meshing engagement with one another until only a small amount of backlash exists;
   (b) moving at least one of said guide gear and said workpiece axially along the rotative axis thereof until said cutting tool deburrs or breaks the side edges of said teeth on one side of said workpiece; and
   (c) moving said guide gear and workpiece into a centered position and out of engagement.

7. The method of claim 6 wherein a said cutting tool is mounted on each axial side of ssaid guide gear and said cutting tools are sequentially moved into engagement with the opposite sides of said workpiece to deburr both side edges of said teeth on said workpiece.

8. A method for the cutting, deburring or breaking of the side tooth edges of straight and helically toothed gears, comprising the method steps of:
   (a) moving a guide gear and workpiece, initially positioned in radial spaced relation and generally centrally radially aligned to one another, and during a rotating drive of at least one of said guide gear and said workpiece, into a meshing engagement with one another until the amount of backlash is reduced to a value zero;
   (b) measuring the then-existing spacing between the axes of said guide gear and said workpiece and compared with a pregiven desired value;
   (c) in the case said spacing between said axes is too small compared with the desired value (workpiece is undersized) or said distance between said axes is too large (workpiece is oversized), said guide gear and said workpiece are disengaged and said workpiece is removed;

(d) in the case said spacing between said axes corresponds with the desired value, the speed of said guide gear and workpiece is increased and said spacing between said axes of said guide gear and said workpiece is enlarged until a small amount of backlash exists;

(e) moving at least one of said guide gear and said workpiece axially along the rotative axis thereof until said cutting tool deburrs or breaks the side edges of said teeth on one side of said workpiece;

(f) moving said guide gear and said workpiece into a centered position for a subsequent disengagement and reduction in the driving speed.

9. The method of claim 8, wherein a said cutting tool is mounted on each axial side of said guide gear and said cutting tools are sequentially moved into engagement with the opposite sides of said workpiece to deburr both side edges of said teeth on said workpiece.

10. The device according to claim 1, wherein a said cutting tool is mounted on each axial side of said guide gear, said means for moving said guide gear and said cutting tool thereon axially causes alternating ones of said cutting tools to engage and form a beveled edge on the corresponding axially facing edges of said teeth on said workpiece.

* * * * *